United States Patent
Lee et al.

(10) Patent No.: US 8,035,793 B2
(45) Date of Patent: Oct. 11, 2011

(54) METHOD OF FABRICATING A LIQUID CRYSTAL DISPLAY COMPRISING APPARATUS FOR DISPENSING SEALANT MATERIAL

(75) Inventors: Sang-Seok Lee, Daegu (KR); Gu-Yun Bok, Seoul (KR); In-Ju Kim, Busan (KR); Heui-Geun Kim, Gyeongsangbuk-Do (KR)

(73) Assignees: LG Display Co., Ltd., Seoul (KR); Top Engineering Co., Ltd., Gyeongsangbuk-do (KR)

( * ) Notice: Subject to any disclaimer, the term of this patent is extended or adjusted under 35 U.S.C. 154(b) by 702 days.

(21) Appl. No.: 11/168,546

(22) Filed: Jun. 29, 2005

(65) Prior Publication Data

US 2006/0139562 A1    Jun. 29, 2006

(30) Foreign Application Priority Data

Dec. 28, 2004 (KR) .................. 10-2004-0114397

(51) Int. Cl.
*G02F 1/1339* (2006.01)
(52) U.S. Cl. ..................... 349/190; 349/153
(58) Field of Classification Search ............... 349/190, 349/153
See application file for complete search history.

(56) References Cited

U.S. PATENT DOCUMENTS

| | | | | |
|---|---|---|---|---|
| 5,828,435 A | * | 10/1998 | Kato et al. | 349/190 |
| 6,144,438 A | * | 11/2000 | Izumi | 349/155 |
| 6,223,941 B1 | * | 5/2001 | Nealey | 222/82 |
| 7,280,179 B2 | * | 10/2007 | Hsu et al. | 349/153 |
| 2004/0001177 A1 | * | 1/2004 | Byun et al. | 349/187 |
| 2004/0011422 A1 | * | 1/2004 | Ryu et al. | 141/95 |
| 2004/0074927 A1 | | 4/2004 | Lafond | |
| 2004/0090590 A1 | * | 5/2004 | Geum | 349/187 |
| 2004/0114094 A1 | * | 6/2004 | Kim et al. | 349/187 |
| 2004/0131758 A1 | | 7/2004 | Jung et al. | |
| 2005/0000982 A1 | | 1/2005 | Ryu et al. | |

FOREIGN PATENT DOCUMENTS

| | | |
|---|---|---|
| CN | 1508594 A | 6/2004 |
| CN | 1550829 A | 12/2004 |
| JP | 62-151979 | 9/1987 |
| JP | 6138028 | 5/1994 |
| JP | 10-043655 | 2/1998 |
| JP | 11-028405 | 2/1999 |
| JP | 2000-202024 | 7/2000 |

* cited by examiner

*Primary Examiner* — Mark Robinson
*Assistant Examiner* — Paisley L Arendt
(74) *Attorney, Agent, or Firm* — McKenna Long & Aldridge, LLP

(57) ABSTRACT

Provided is an apparatus for dispensing sealant material including: a disposable syringe in which sealant material is filled; a nozzle member installed at a bottom portion of the syringe, for dispensing the sealant material over a substrate; and a gas supply unit for supplying gas into the syringe to apply pressure to the sealant material in a syringe main body, and dispensing the sealant material.

7 Claims, 5 Drawing Sheets

METHOD OF FABRICATING A LIQUID CRYSTAL DISPLAY COMPRISING APPARATUS FOR DISPENSING SEALANT MATERIAL

This application claims the benefit of Korean Patent Application No. 2004-114397, filed on Dec. 28, 2004, which is hereby incorporated by reference in its entirety for all purposes as if fully set forth herein.

BACKGROUND OF THE INVENTION

1. Field of the Invention

The present invention relates to an apparatus for dispensing sealant material of a liquid crystal display device, and more particularly, to an apparatus for dispensing sealant material of a liquid crystal display device in which a washing processing is not required. According to the present invention, poor quality of a cell gap because of debris (foreign object) can be effectively prevented by using a disposable syringe.

2. Discussion of the Related Art

In general, a liquid crystal display device is a display device in which a data signals according to image information are individually provided to liquid crystal cells disposed in a matrix to adjust a light transmissivity of the liquid crystal cells, and accordingly desired images can be displayed.

In general, the liquid crystal display device includes a liquid crystal display panel on which liquid crystal cells in a pixel unit are disposed in a matrix and a driver integrated circuit (IC) for driving the liquid crystal cells.

The liquid crystal display panel typically includes a color filter substrate and a thin film transistor array substrate that face each other, and a liquid crystal layer positioned between the color filter substrate and the thin film transistor array substrate.

A plurality of data lines for transmitting data signals provided from a data driver IC to the liquid crystal cells are orthogonal to a plurality of gate lines for transmitting scan signals provided from the gate driver IC to the liquid crystal cells on the thin film transistor array substrate of the liquid crystal display panel. The liquid crystal cells are defined at crossings between those data lines and gate lines.

The gate driver IC provides the scan signal in sequence to the plurality of gate lines to allow the liquid crystal cells disposed in the matrix to be sequentially selected for each gate line, and the liquid crystal cells of the one selected gate line receive a data signal from the data driver IC.

On the other hand, a common electrode and a pixel electrode are provided respectively at each facing inner surface of the color filter substrate and the thin film transistor array substrate to apply an electric field to the liquid crystal layer. A pixel electrode is positioned at the thin film transistor array substrate of each liquid crystal cell, while the common electrode is formed at a front surface of the color filter substrate. Therefore, the light transmissivity of the liquid crystal cells can individually be adjusted by controlling a voltage applied to the pixel electrode in when a voltage has been applied to the common electrode.

Thus, in order to control the voltage applied to the pixel electrode by a liquid crystal cell, each liquid crystal cell is provided with a thin film transistor as a switching device.

Those components of the aforementioned liquid crystal display device will be explained in detail with reference to the accompanying drawings as follows.

FIG. 1 is an exemplary view showing a schematic plan view of a unit liquid crystal display panel for which a thin film transistor array substrate and a color filter substrate of a liquid crystal display device face each other and are attached.

Referring to FIG. 1, a liquid crystal display panel 100 includes an image display unit 113 on which liquid crystal cells are disposed in a matrix, a gate pad unit 114 connected to gate lines of the image display unit 113, and a data pad unit 115 connected to data lines. Here, the gate pad unit 114 and the data pad unit 115 are formed at edge areas of a thin film transistor array substrate 101 in an area that does not overlap with a color filter substrate 102. The gate pad unit 114 provides a scan signal provided by a gate driver integrated circuit (IC) to the gate lines of the image display unit 113, while the data pad unit 115 provides image information (e.g., data signals) provided by the data driver IC to the data lines of the image display unit 113.

The data lines to which the image information is applied and the gate lines to which the scan signal is applied are arranged to perpendicularly cross each other at the thin film transistor array substrate 101 of the image display unit 113. The thin film transistor array substrate 101 include: a thin film transistor positioned at crossings between the data lines and the gate lines for switching liquid crystal cells; a pixel electrode connected to the thin film transistor for driving the liquid crystal cells; and a protection film formed at a front surface thereof for protecting the electrode and the thin film transistor.

The color filter substrate 102 of the image display unit 113 includes color filters separated by a black matrix according to a cell region and coated thereon, and a transparent common electrode which is a counter electrode of the pixel electrode positioned at the thin film transistor array substrate 101.

Such a thin film transistor array substrate 101 and the color filter substrate 102 maintain a predetermined cell gap by a spacer and are attached by a seal line 116 positioned at an outside of the image display unit 113, thereby forming a unit liquid crystal display panel.

In fabricating such unit liquid crystal display panel, a method for forming a plurality of unit liquid crystal display panels simultaneously on a large aperture mother substrate may be used in order to improve yield. Therefore, a processes for cutting and processing the mother substrate on which the plurality of liquid crystal display panels have been fabricated and thus separating the unit liquid crystal display panels from the large aperture mother substrate are required.

In the unit liquid crystal display panel separated from the large aperture mother substrate, a liquid crystal layer is positioned between the thin film transistor array substrate 101 and the color filter substrate 102 by injecting liquid crystal through a liquid crystal injection opening. Afterwards, the liquid crystal injection opening is encapsulated.

As described above, in order to fabricate the unit liquid crystal display panel, are various processes are required, including a process for individually fabricating a plurality of thin film transistor array substrates 101 and color filter substrates 102 at separate first and second mother substrates, and another process for attaching the first and second mother substrates to maintain a uniform cell gap, and a process for cutting it into unit liquid crystal display panels, thereafter injecting liquid crystal.

In particular, in order to attach the first and second mother substrates to maintain the uniform cell gap, a process for forming a seal line 116 at an outside of the image display unit 113 is required. Here, the method for forming the seal line 116 of the related art will be described in detail with reference to drawings.

FIGS. 2A and 2B are exemplary views illustrating a screen printing method for forming a seal line. As illustrated in FIGS. 2A and 2B, a screen printing apparatus includes a screen mask 206 patterned to allow a region for forming a seal line 216 to be selectively exposed and a squeegee 208 for selectively supplying a sealant 203 onto a substrate 200 through the screen mask 206 and forming the seal line 216.

The seal line 216 formed on the substrate 200 arranges a gap to inject liquid crystal thereinto and prevents leakage of the injected liquid crystal. Therefore, the seal line 216 is positioned along edges of the image display unit 213 of the substrate 200, and a liquid crystal injection opening 204 is located at a certain side of the seal line 216.

Thus, the screen printing method includes a step of forming the seal line 216 on the substrate 200 by depositing the sealant 203 over the screen mask 206 at which a region for forming the seal line 216 has been patterned and printing it with the squeegee 208; and a step of drying the seal line 216 by evaporating a solvent contained in the seal line 216 and leveling it.

The screen printing method has an excellent convenience of processes and therefore has been generally used. However, the sealant consumption is disadvantageously high because of forming the seal line 216 by depositing the sealant 203 over a front surface of the screen mask 206 and printing it with the squeegee 208.

Further, since the screen mask 206 is in contact with the substrate 200, a rubbing defect could occur in an alignment layer (not shown) positioned on the substrate 200, which causes a degradation of image quality of a liquid crystal display device.

SUMMARY OF THE INVENTION

Accordingly, the present invention is directed to an apparatus for dispensing sealant material of a liquid crystal display device.

Therefore, an advantage of the present invention is to provide an apparatus for dispensing sealant material capable of directly dispensing the sealant material in a seal line forming region of a substrate.

Another advantage of the present invention is to provide an apparatus for dispensing sealant material which is not required for a washing processing by forming a disposable syringe in which the sealant material is filled, and replacing and using the disposable syringe with a new syringe after dispensing the sealant material a designated number of times.

Still another advantage of the present invention is to provide an apparatus for dispensing sealant material capable of preventing a cell gap defect by doping a solidified sealant material in a syringe into a seal line by using a disposable syringe.

Additional features and advantages of the invention will be set forth in the description that follows, and in part will be apparent from the description or may be learned by practice of the invention. The objectives and other advantages of the invention will be realized and attached by the structure particularly pointed out in the written description and claims hereof, as well as the appended drawings.

To achieve these and other advantages and in accordance with the purpose of the present invention, as embodied and broadly described herein, there is provided an apparatus for dispensing sealant material including a disposable syringe in which the sealant material is filled, a nozzle member installed at a bottom portion of the syringe, for dispensing the sealant material over a substrate, and a gas supply unit for supplying gas to the syringe and applying pressure to the sealant material in a syringe main body to thereby dispense the sealant material, wherein the syringe is composed of a main body which is used once and discarded and a case in which the main body is accommodated, wherein the main body is transparent, and the case has a window to enable a survey of an amount of sealant material remaining in the main body. Also, the main body is made of polypropylene or polyethylene to prevent ultraviolet rays.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
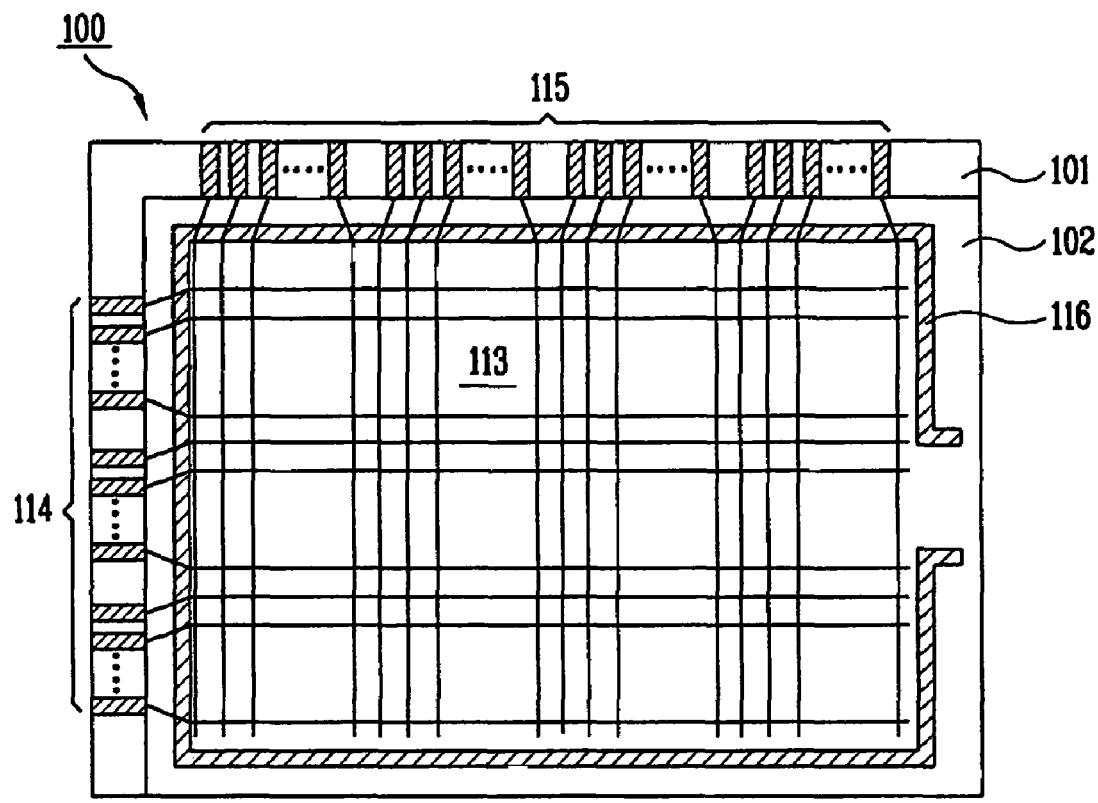
FIG. 1 is a plan view illustrating a schematic structure of a liquid crystal display device according to the related art.
Figure 2A:
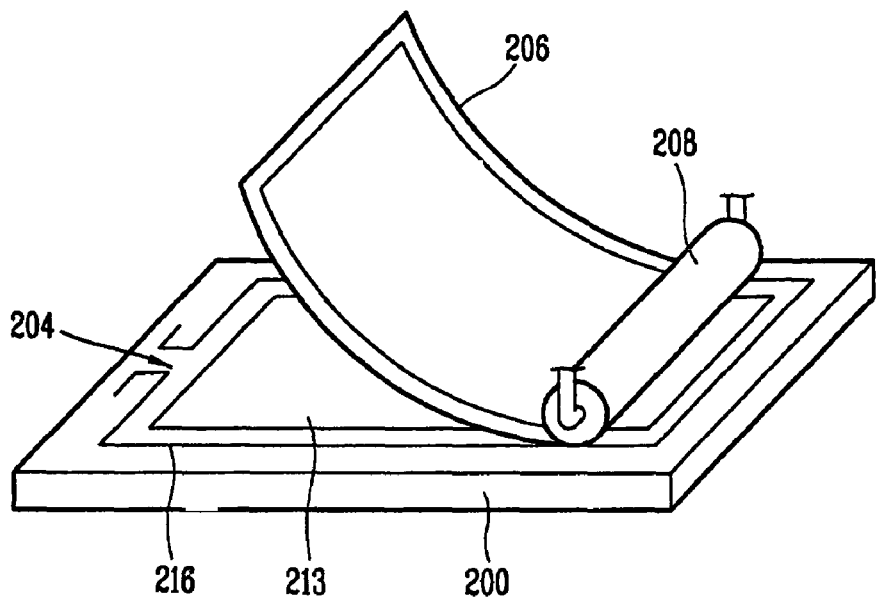
FIGS. 2A and 2B are exemplary views illustrating a method for forming a seal line according to a screen printing method of the related art.
Figure 2B:
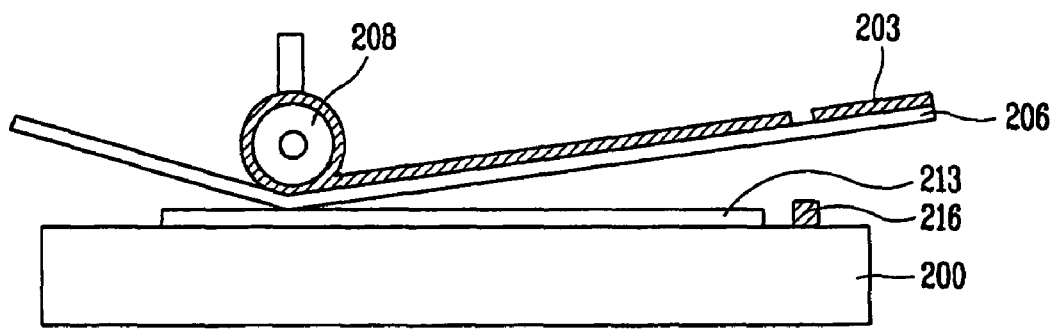
Figure 3:
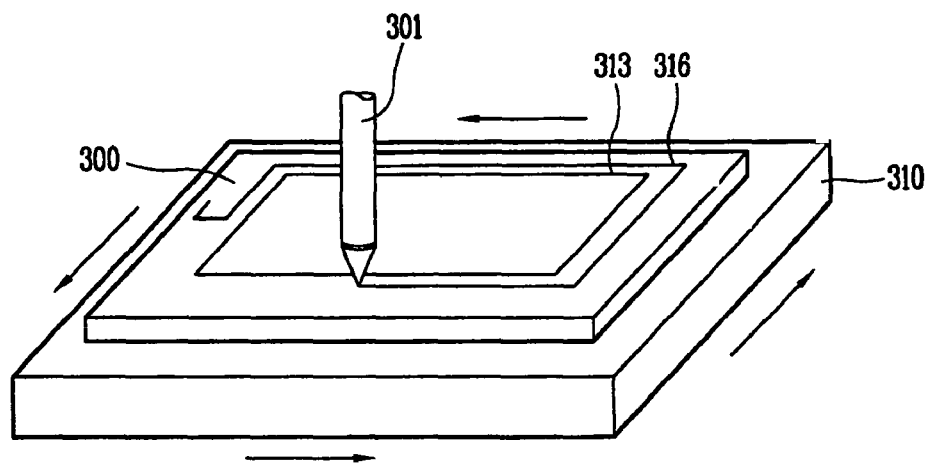
FIG. 3 illustrates general concepts of a method for dispensing sealant material according to the present invention.

The present invention is directed to a sealant dispensing method in order to minimize sealant consumption and prevent a rubbing defect resulting from contact on a substrate. General concepts of the sealant dispensing method in which sealant material is directly dispensed or dropped in a region where a seal line is formed can be seen in FIG. 3. As illustrated in FIG. 3, in the sealant dispensing method, a stage 310 loaded with a substrate 300 moves in front/rear and right/left directions. A sealant is provided in syringe 301. Predetermined pressure is applied to the sealant in the syringe 301, and, as a result, a seal line 316 is formed along edges of an image display unit 313 of the substrate 300.

Because the sealant material is selectively dropped in a region where the seal line 316 is to be positioned, the present sealant dispensing method is effective to reduce the sealant consumption. Further, because the sealant material is selectively dispensed only along outlines of the image display unit 313 of the substrate, the image display unit does not contact the sealant so as to effectively prevent a rubbing defect of an alignment layer (not shown).

Thus, hereinafter, a sealant dispenser for a liquid crystal display panel according to the present invention will be explained in more detail with reference to FIG. 4, as follows.

Figure 4:
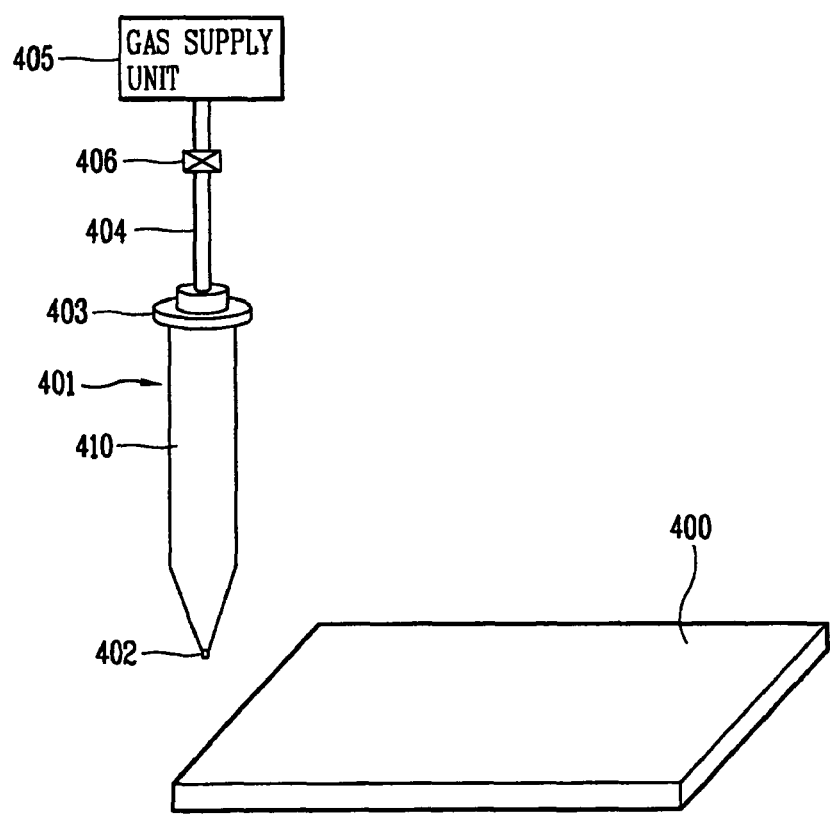
FIG. 4 illustrates a structure of an apparatus for dispensing sealant material according to the present invention.

As illustrated in FIG. 4, the sealant dispenser 401 include: a syringe 410 in which sealant and liquid dispensed materials are filled; a nozzle member 402 positioned at a bottom portion of the syringe 410, for discharging the sealant filled in the syringe 410; a cap member 403 installed at an upper portion of the syringe 410; a gas supply unit 405 for supplying gas into the syringe 410 through a gas supply pipe 404 connected to the cap member 403 and dispensing the sealant filled in the syringe 410 through a nozzle by pressure of the supplied gas; and a flow valve 406 installed at the gas supply pipe 404, for adjusting an amount of the gas supplied into the syringe 410, namely, the pressure of the gas applied into the syringe 410 and thereby adjusting an amount of the dispensed sealant.

In general, because the dispensed material such as the sealant has high viscosity, if it is filled in the syringe 410, it is difficult to be discharged through the nozzle member 402. Therefore, in order to dispense the sealant over the substrate, pressure must be applied to the sealant filled in the syringe 410. The pressure applied to the sealant is determined according to the amount of gas supplied to the syringe 410. Accordingly, the amount of the sealant that is dispensed over the substrate 400 can be adjusted by operating the flow valve 406 which controls the amount of the gas. At this time, the flow valve 406 can be hand-operated or automatically operated. In particular, the amount of currently-dispensed sealant may be measured and compared with a designated dispensed amount of the sealant. As a result, it is possible to adjust the amount of dispensed sealant in real time.

Figure 5A:
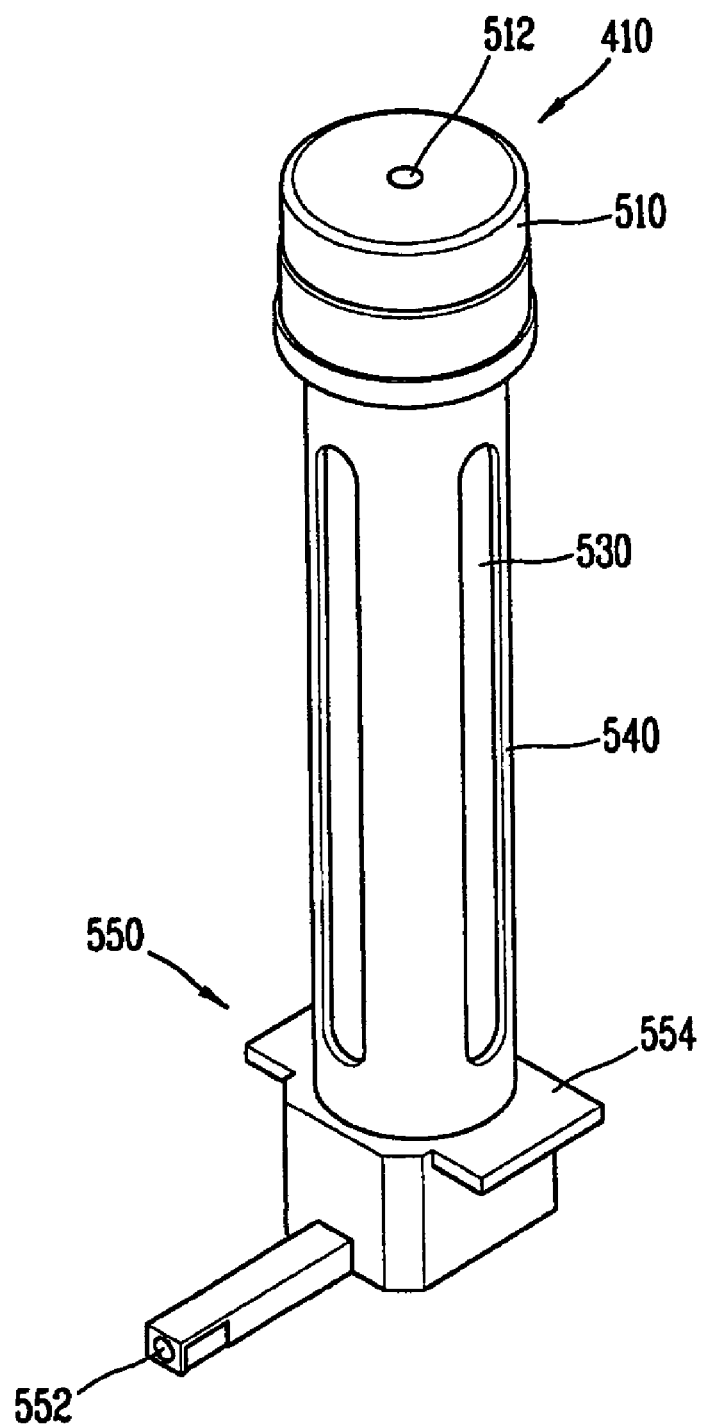
FIG. 5A is a perspective view illustrating a structure of a syringe of an apparatus for dispensing sealant material according to the present invention.
Figure 5B:
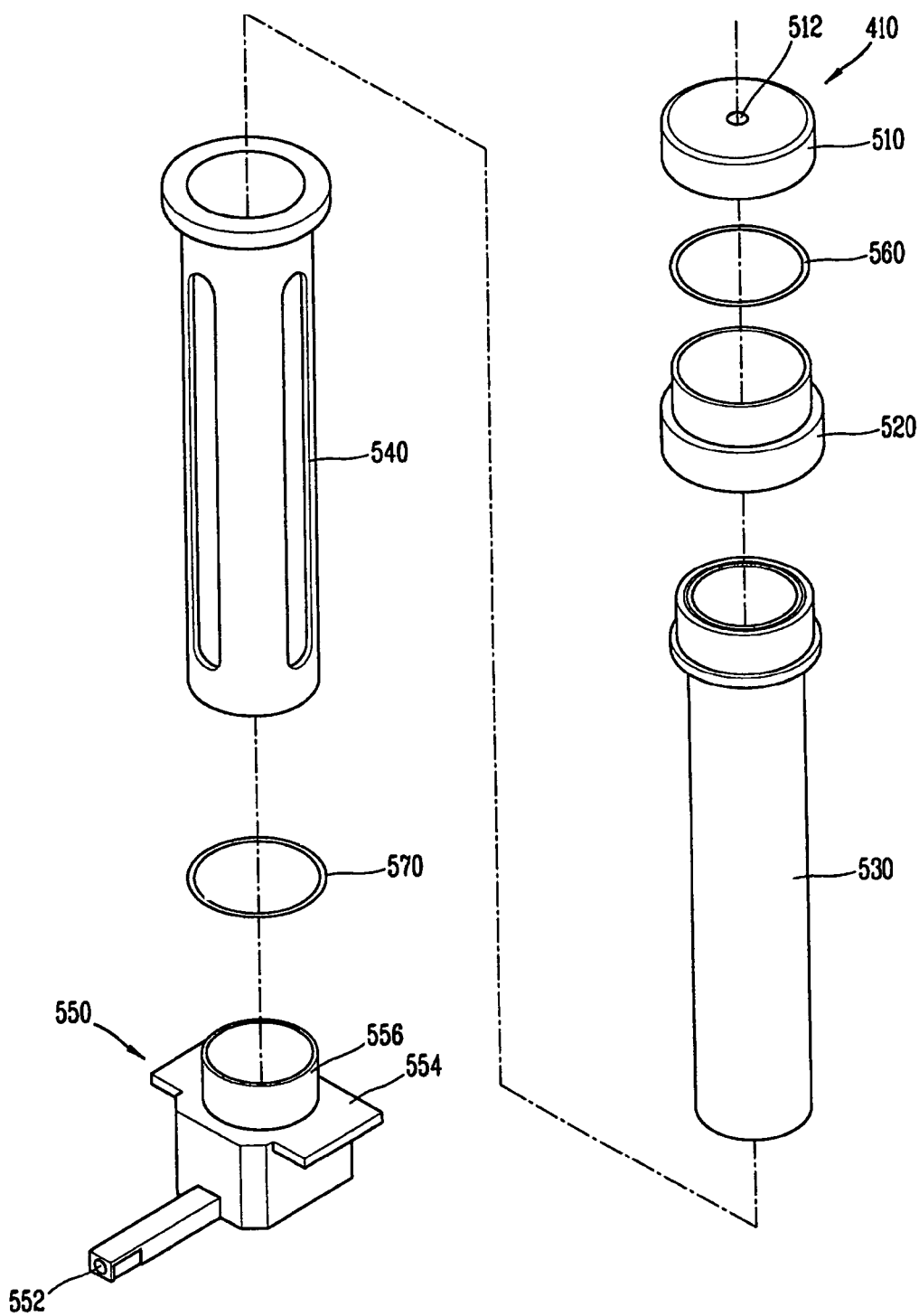
FIG. 5B is an exploded perspective view showing a structure of a syringe of an apparatus for dispensing sealant material according to the present invention.

FIGS. 5A and 5B illustrates structures of the syringe 410. FIG. 5A is a perspective view thereof, and FIG. 5B is an exploded perspective view thereof.

As can be seen from FIGS. 5A and 5B, the syringe 410 includes a syringe main body 530; a case 540 in which the syringe main body 530 is accommodated; a cap member 510 positioned at an upper portion of the main body 530 for its encapsulation, and having a hole 512 therein to supply gas into the main body 530; and a nozzle member 550 positioned at a bottom portion of the main body 530 for dispensing sealant material in the main body 530 over the substrate according to gas supplied. Further, the syringe 410 is provided with O-rings 560 and 570 for sealing between the main body 530 and the cap member 510 and between the main body 530 and the nozzle member 550, and also provided with a coupling unit 520 for coupling the cap member 510 and the case 540 therebetween.

The syringe main body 530 may be made of a polymer such as polypropylene or polyethylene.

The syringe main body 530 can be formed of aluminum or the like. The aluminum is a material which is permanent and requires high prices. As a result, in case of using the main body 530 formed of the aluminum when dispensing the sealant material, after completely dispensing the sealant filled in the main body 530, the main body 530 should be washed for the sequential dispensation processing. Here, the reason why the main body 530 should be washed is to prevent the sealant remaining in the main body after dispensing from solidifying. When the solidified sealant is doped in the seal line, a regional gap difference may occur in the liquid crystal display panel when attaching the substrate, possibly causing stains due to a light source may occur at an edge region of the panel. Therefore, the solidified sealant (i.e., the sealant remnant) can be removed by washing the main body 530. As a result of the washing processing, the cell gap defect can be prevented. Thus, in case that the syringe main body 530 is formed of the aluminum, whenever the filled sealant is completely dispensed (or whenever the dispensation is completed a designated number of times), the main body 530 should be washed. As a result, the fabrication processing of the liquid crystal display device is inefficiently delayed.

However, in case of forming the syringe main body 530 using lower priced polypropylene or polyethylene, after completely dispensing the filled sealant, the used main body 530 was discarded (i.e., the main body 530 is disposable). As a result, the washing processing for the main body 530 is not required and, accordingly, a processing delay does not occur.

Because the polypropylene or the polyethylene has a superior plasticity, it is easy to obtain a desired shaped main body therefrom. Also, because it does not react with the sealant when the sealant is filled in a main body, it is effective to prevent a deformation of the sealant. Furthermore, because the polypropylene or the polyethylene blocks ultraviolet light, it is also effective to prevent transformation of the sealant filled in the main body 530 due to the ultraviolet light when dispensing the sealant.

Since the polypropylene or the polyethylene has low intensity, however, it is easy to be deformed by a small impact from the outside. Particularly because the main body 530 made of polypropylene or polyethylene may be deformed so as to be unusable for dispensing the sealant in a correct position, the main body 530 may be accommodated in the case 540, which is formed of a material having high intensity such as stainless steel.

At this time, the case 540 has a window so that the main body 530 in the case 540 is observed therethrough. Since the main body 530 is also formed of transparent polypropylene or polyethylene, the sealant filled in the main body 530 can be seen through the window of the case 540 so that the residual amount of the sealant in the syringe 410 can be recognized in real time. Therefore, a seal line defect due to a lack of sealant in the syringe 410 can be avoided. Furthermore, unnecessary sealant consumption can be prevented by dispensing even the last drop of sealant in the syringe 410 according to the observation.

The nozzle member 550 includes a nozzle 552 through which the sealant is actually dispensed and a nozzle fixing unit 554 to which the nozzle 552 is fixed. Here, a screw thread 556 may be formed at the outside of the nozzle fixing unit 554 to couple the nozzle fixing unit 554 and the case 540. The screw thread 556 may also be formed in the nozzle fixing unit 554. However, as the screw thread 556 is positioned at the outside of the nozzle fixing unit 554 as aforementioned, it can be washed by a simple method after separating it from the case 540.

As described above, in the present invention, since the syringe main body of the apparatus for dispensing the sealant is configured to be disposable to omit the syringe washing processing, the seal line can be formed without interrupting the sealant dispensation process by the washing process. Also, after discarding the used syringe main body, the sealant may be continually dispensed using a new syringe main body. Thus it is possible to prevent a solidified sealant from being doped in the seal line. As a result, an occurrence of a gap defect of the liquid crystal display device can be effectively prevented.

Furthermore, in the present invention, the syringe main body may be transparent to allow the residual amount of the sealant in the syringe to be observed in real time. Thus, a seal line defect due to a lack of the sealant can be prevented, and unnecessary sealant consumption can also be avoided.

As described so far, in the present invention, the disposable syringe is used. Accordingly, after dispensing the sealant material, the used disposable syringe is replaced with a new syringe so that the dispensing process can easily be continued. Even if only the apparatus for dispensing the sealant material has been explained so far, the explanation only shows an example of the present invention. The present invention may not be limited in the apparatus for dispensing the sealant material but can be applied to a dispensing apparatus for various materials.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating an LCD, comprising:
providing first and second substrates;
dispensing liquid crystal material on at least one of the first and second substrates;
dispensing a sealant material on at least one of the first and second substrates using a dispenser having a disposable syringe body, a syringe case having a cylindrical shape to contain the disposable syringe body, a cap at an upper portion of the disposable syringe body to introduce a gas within the disposable syringe body, and a nozzle member to dispense the sealant material on at least one of the first and second substrates, the disposable syringe body being transparent and made of a material for blocking an ultraviolet ray and the syringe case having at least one window for observing an amount of the sealant material in the disposable syringe body, the nozzle member having a nozzle through which the sealant material is dispensed and a nozzle fixing unit to which the nozzle is fixed, the nozzle fixing unit separably coupled to the syringe case, and the nozzle is extended from the nozzle fixing unit in a predetermined distance so that the extension direction of the nozzle is perpendicular to the cylindrical axis of the syringe case;
attaching the first and second substrates; and
discarding the used disposable syringe body and replacing the used disposable syringe body with a new syringe body;
wherein said dispensing a sealant material includes:
providing the sealant material to the disposable syringe body;
placing the disposable syringe body in the syringe case, forming a syringe; and
dispensing the sealant material through the nozzle.

2. The method of claim 1, further comprising controlling an amount of sealant dispensed on the at least one of the first and second substrates by controlling a speed of the syringe relative to the at least one of the first and second substrates.

3. The method of claim 2, wherein a position of the substrate is fixed and the syringe moves.

4. The method of claim 2, wherein a position of the syringe is fixed and the substrate moves.

5. The method of claim 2, wherein a position of the substrate is fixed and the nozzle member moves.

6. The method of claim 2, wherein a position of the nozzle member is fixed and the substrate moves.

7. The method of claim 2, wherein said replacing the used disposable syringe body with a new syringe body further includes washing the nozzle member and coupling the washed nozzle member to the syringe case.

* * * * *